(12) United States Patent
Miller et al.

(10) Patent No.: US 8,634,529 B2
(45) Date of Patent: Jan. 21, 2014

(54) SERVICES RELATED TO CONFERENCE CALLS

(75) Inventors: Thomas R. Miller, Colorado Springs, CO (US); Lee Inman, Colorado Springs, CO (US)

(73) Assignee: Amercian Teleconferencing Services, Ltd, Atlanta, GA (US)

( * ) Notice: Subject to any disclaimer, the term of this patent is extended or adjusted under 35 U.S.C. 154(b) by 1225 days.

(21) Appl. No.: 11/776,681

(22) Filed: Jul. 12, 2007

(65) Prior Publication Data

US 2009/0016513 A1 Jan. 15, 2009

(51) Int. Cl.
*H04M 3/42* (2006.01)
*H04M 1/64* (2006.01)

(52) U.S. Cl.
USPC .................. 379/202.01; 379/67.1; 379/88.25

(58) Field of Classification Search
USPC ............. 379/202.01, 88.25, 265.06, 67.1, 85; 348/14.06; 455/416; 370/260
See application file for complete search history.

(56) References Cited

U.S. PATENT DOCUMENTS

| | | | | |
|---|---|---|---|---|
| 7,466,334 | B1 * | 12/2008 | Baba | 348/14.06 |
| 7,899,178 | B2 * | 3/2011 | Williams et al. | 379/265.06 |
| 2002/0067810 | A1 * | 6/2002 | Barak et al. | 379/88.25 |

* cited by examiner

*Primary Examiner* — Thjuan K Addy
(74) *Attorney, Agent, or Firm* — Smith Risley Tempel Santos LLC

(57) ABSTRACT

An improved conference calling system that operates to correlate a conference call with other conference calls, along with collateral information pertinent to the conference call, and deliver the correlated information to conference call participants or other entities. When setting up a conference call, a reservation system interface enables a user to not only schedule the conference call, but to also enter information that can be used to (a) correlate the instance conference call with previous or future conference calls, (b) set up for the recordation of the conference call, (c) set up for the delivery of the recorded conference call through one or more media channels, and (d) provide the recorded conference call as well as any related collateral and correlated conference calls to various parties.

16 Claims, 2 Drawing Sheets

SERVICES RELATED TO CONFERENCE CALLS

RELATED APPLICATIONS

This application is related to, and hereby incorporates by reference, the United States Patent Application that was filed concurrently herewith on Jul. 12, 2007, assigned Ser. No. 11/776,706, is entitled DYNAMIC CONFIGURATION OF CONFERENCE CALLS.

BACKGROUND OF THE INVENTION

Imagine a telephone technology that allows more than one party to be on a telephone call at the same time—you might want to call it a conference call. Now, imagine trying to explain this technology to your grandfather or grandmother that grew up in the 20's. They would look at you like you are crazy. Not because you were blowing them away with a deep, technological description of a new innovation but rather, they would think you were crazy because it would sound very much like the telephone systems they grew up with—the party lines. It was not all that long ago that you could actually find party line service being offered and used by telephone customers. In case you are not aware of it, prior to 1970, some rural residential customers and even city residential customers did not have private telephone lines running to their homes. Rather, a single line was used by multiple homes, sometimes as many as 20 or more homes. With a party line, while you are in the middle of a telephone conversation, your neighbor could simply pick up his or her telephone and listen to your conversation. Similarly, if you wanted to place a call, when you picked up the telephone receiver you may find that someone else was already engaged in a telephone call at the time. To use the telephone, you would have to convince them to hang up and free up the line for your use or, simply wait. So, you can see why a high-level explanation of a conference call system would sound crazy to your grandparents.

However, in today's world, where every house has one or more private lines, businesses are spread out across the country and the world, and decisions need to be made in a timely manner, one can appreciate the existence of conference calling capabilities. Conference call technology has migrated through the years from 3-way calling, to today's highly complex conference call systems that enable users to setup a dial-in conference call number and an access code to enable call conferencing. In operation, a user dials the conference call number and enters or states the access code to gain access to the multi-party conference call.

As with most advances in technology, the advancements in conference call technology were not immune to the "VCR Syndrome". The VCR syndrome refers to the scenario in which a great technological advancement is in essence, unavailable to many users simply because it is too complicated to learn. Although user interfaces have been introduced and deployed for conference call systems, there is still a need in the art for a new user interface that makes the process of setting up and managing a conference call more accessible to a wider range of users.

In a business setting, meetings are simply unavoidable. For a company to run smoothly, the members of the company must communicate. One of the keys to a successful company is the leadership team learning to communicate effectively and efficiently amongst themselves. When one conjures up a vision of a typical business meeting, you picture the business participants talking around a large table and a secretary feverishly recording everything that is said. The secretary then types up meeting notes that can be distributed to the participants of the meeting and others that missed the meeting or could benefit from the information. In a conference call setting, a secretary may perform the same function; however, what is needed in the art is a technique to automate such a process or a similar process. In addition, in many situations multiple conference calls may be required in addressing certain issues, reaching particular decisions, etc. What is needed in the art is the ability to correlate various conference calls, deliver the content of the conference calls to interested parties, and to configure the specific parameters of the correlation and media delivery.

BRIEF SUMMARY OF THE INVENTION

The present invention addresses the above-described needs in the art, as well as others by providing a conference calling system or an interface to a conference calling system that enables various conference calls to be recorded, formatted to a desired format, correlated with other related conference calls or collateral information and then delivered to a user, participant or other interested party using a variety of delivery mechanisms. One embodiment of the present invention enables a host to setup a multiparty conference call thereby obtaining a call-in number and pass code. The host may then identify correlation information, either before the conference call, during the conference call or following the conference call, to be used to correlate this conference call with previous conference calls and/or future conference calls and/or co-existing conference calls. The correlation information can be used to identify conference calls that are logistically related, content related or otherwise related. In addition, the present invention may be utilized to correlate the conference call with other collateral such as power point presentations, handouts, reports, research background and support information, figures, video feeds, etc.

One particular application of the present invention is in the field of investor conference calls. In this embodiment, various investors may or may not be able to participate in the one or more conference calls related to making an investment decision for a particular company. Utilizing an embodiment of the present invention, the various conference calls can be correlated and joined together with collateral information and periodically delivered to the potential investor for review. Similarly, the investor may wish to identify information relevant to a particular aspect of a company, such as quarterly earnings. In embodiments of the present invention, such an investor can access a web site and request delivery of past conference calls for a given period of time and/or future conference calls for a given period time, along with collateral information, that relates to any discussion about the quarterly earnings of a company.

Thus, the present invention not only provides a new and improved conference calling system, but provides a mechanism for indexing and accessing the information contained in the conference calls, as well as collateral information for use by various parties. The provision, delivery and format of the delivered information can be controlled by the host of the conference call in some embodiments, controlled by various participants or other entities on an individualized basis in other embodiments, or a combination of both in other embodiments.

One embodiment of the present invention includes a method for providing post-conference call information to various individuals. In operation, a conference call set-up, information including correlation information, is received along with the identification of a type of media for recording and delivering the conference call and related information. Actions take place during and after the conference call including correlating the conference call in accordance with the correlation information. The conference call is then delivered in accordance with the media target identification. The correlation information received can include a correlation factor and or correlation data. Further, the correlation factor may include information that indicates whether this conference call is a stand-alone conference call or is related to other conference calls. In addition, the correlation information may include correlation data that is related to the content of the conference call such as key words included in the conference call and/or an outline of the conference call. The media target identification may include a variety of identifications including an indicator for burning a compact disk, for performing an ftp transfer, and/or for performing an email delivery. The information delivered can include a simple conference call, one or more related conference calls, a conference call and related collateral, or one or more conference calls and related collateral.

The present invention may be implemented within a system that includes a conference manager, a recorder, a format module, a correlator and a delivery module. The conference manager interfaces to a telephone network and controls the access to and monitoring of a conference call. The recorder operates to record a particular conference call and in conjunction with a format module, places the recorded conference call into a particular format. The correlator operates to characterize the particular conference call in a manner that enables it to be correlated with other conference calls and collateral information and the delivery module provides one or more delivery mechanisms for the delivery of the information.

DETAILED DESCRIPTION OF THE INVENTION

The present invention is directed towards an improved conference calling system that operates to correlate other conference calls, along with collateral information pertinent to the conference call, and deliver the correlated information to conference call participants or other entities. More specifically, when setting up a conference call, one aspect of the present invention provides a reservation system interface that enables a user to not only schedule the conference call, but to also enter information that can be used to (a) correlate the instance conference call with previous or future conference calls, (b) set up for the recordation of the conference call, (c) set up for the delivery of the recorded conference call through one or more media channels, and (d) provide the recorded conference call as well as any related collateral and correlated conference calls to various parties. These and other aspects, features and embodiments of the present invention are more specifically described in conjunction with the description of the drawings.

Figure 1:
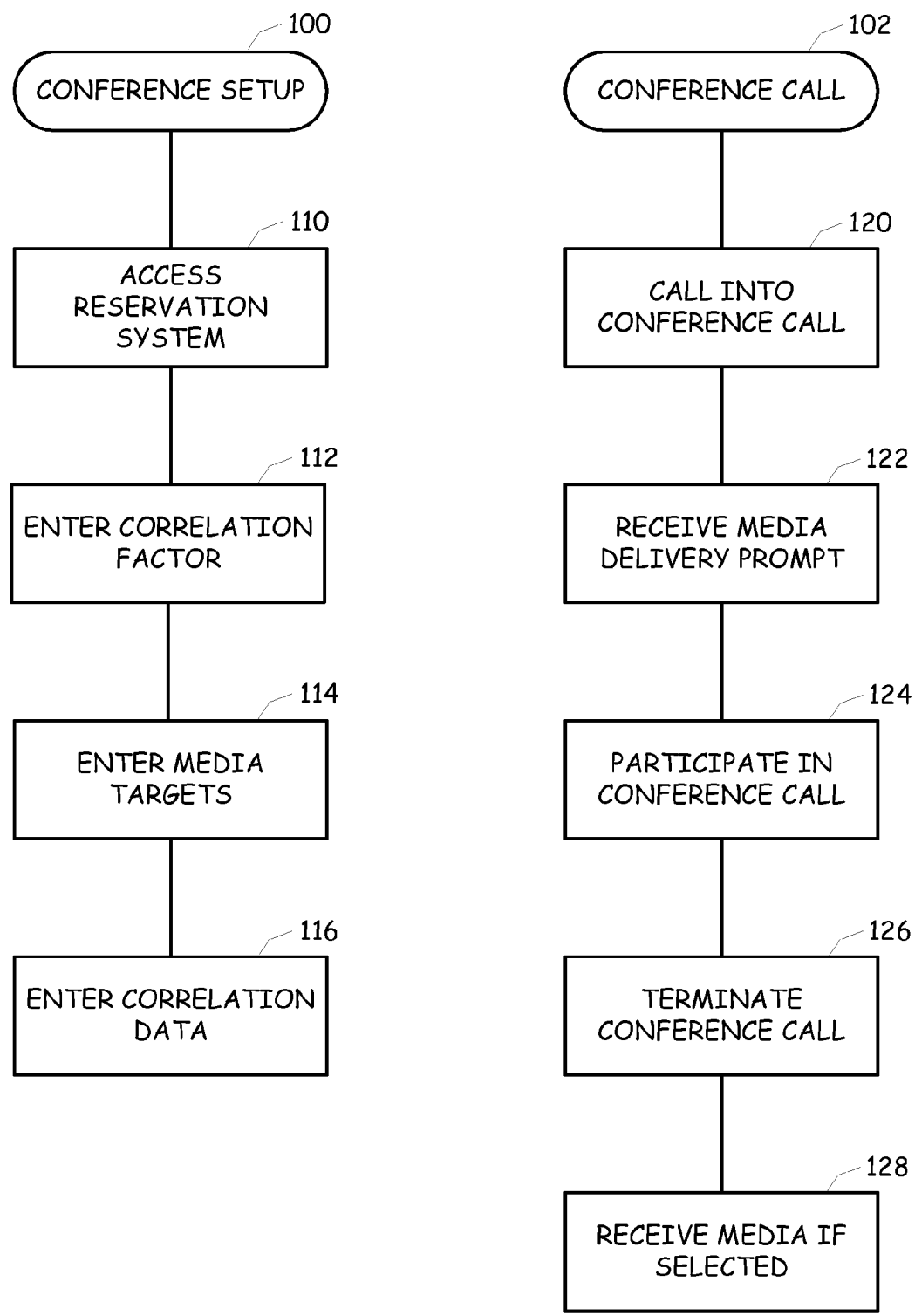
FIG. 1 is a flowchart diagram of the general steps involved in one embodiment of the present invention that includes the correlation, media selection and delivery aspects of the present invention.

FIG. 1 is a flowchart diagram of the general steps involved in one embodiment of the present invention that includes the correlation, media selection and delivery aspects of the present invention. As can be seen from FIG. 1, the flowchart diagram includes two separate branches, a conference setup branch 100 and a conference call branch 102. Similar to many conference call systems, the user, coordinator or host of the conference call interfaces to a reservation system to setup the conference call 110. Various embodiments of the present invention may use reservations systems that are accessed through a dial-in system with voice commands, DTMF control or user operator controlled, web accessed systems, faxed in requests, email provisioned systems, or the like.

While interfacing to the reservation system, as in typical conference call systems, the user can identify the time and date of the conference call, and receive a call in number and access code for the conference. In addition, various embodiments of the present invention allow the user to identify the parties to participate in the conference call as well as pertinent information about the participants. Embodiments of the present invention also allow the user to enter correlation information and/or the identification of target media and/or whether the conference will be recorded. It should also be appreciated that other embodiments of the invention may not employ the traditional call-in number and access code entry conference calls. Rather, the conference call system may receive participant telephone numbers and initiate the call the various participants. The present invention may also be incorporated into other conference call system structures.

In general, the correlation information is used to identify other conferences to which the present conference call is related. This can take the form of identifying information that can be used to associate the present conference call with future or coterminous calls, and/or may take the form of identifying information that can be used to associate the present conference with previously conducted conference calls. The correlation information may take on a variety of forms, some of which are described herein as non-limiting examples. Although some of the non-limiting examples may in and of themselves be considered novel aspects of the present invention, the present invention is not specifically limited to the disclosed embodiments.

In one embodiment, the correlation information may include a correlation factor 112. The correlation factor can be used to identify a series of conference calls that are related. For instance, the correlation factor may include a specific day of the week and time of day. With such information, future and/or past conference calls that likewise occurred on that day and time may be considered part of the same compilation. Similarly, the correlation factor may include a conference identifier that is further used to identify related conference calls in conjunction with the day and time information, or may be utilized independently to correlate various conference calls. It will be appreciated that many variations could be applied to implement this aspect of the present invention including, the conference call call-in number, the access code, the identity of the parties, the subject of the conference call, periodicity of the conference call (i.e. daily, weekly, monthly, etc), as well as other information. Those skilled in the art will appreciate that these variations, as well as other and combinations of these and these variations with other variations could all be used to identify related conference calls.

The correlation information may also include content based correlation data 116. For instance, key words may be associated with the conference call. The key words may be words that are spoken during the conference call or simply words that are related to the conference call content. For instance, in one embodiment, the key words may include:

annual report, S1, revenue, net income, EBITDA, gross revenue, etc. These keywords may then be used to correlate conference calls together. Also, along with key words or independent thereof, the present invention may use an outline of the conference call to correlate with other conference calls. Thus, each topic or subtopic addressed in the conference call can be listed and used to index similar or related conference calls.

In one embodiment of the present invention, the user may be requested to enter correlation information either at the beginning, end, or even during the conference call. For instance, as various subjects are addressed in a conference call, the host may type or otherwise enter correlation data. Thus, if the reservation system or conference system includes a web based user interface, the host or other party can pull up the web page and enter correlation data prior to the start of the conference, during the conference or at the conclusion of the conference. It should be appreciated that the correlation data can be defined and entered by the host, or that this can be done on an individual participant or other individual basis. For instance, if a company wishes to have correlated conferences and data, the host or a company designee may enter the correlation data. However, if an individual wants to correlate conference calls and information for conference calls that he or she has participated in or has access to, then the individual may access the conference call interface web page and enter correlation information.

In another embodiment, the conference call system may have canned sets of correlation information that may be selected by a user of the system. In another embodiment, the conference call system may include canned sets of correlation information as well as providing the ability, as described above, to define custom correlation information.

In addition to entering the correlation information (112 and 116), the user enters the identification of media targets 114. This step involves identifying one more delivery mechanisms for the correlated conference call information, or simply for the recorded conference call. For instance, in one embodiment of the present invention, the conference call host may select from one of several media destinations for the recorded conference call including, but not limited to burning a CD to be mailed to participants or other entities, transferring the recorded conference call via an FTP transfer, attaching the recorded conference call to an email message, pushing the recorded conference call up to another delivery source such as a i-tunes, MP3.com or a pod casts delivery system. In addition to or alternatively, an embodiment of the present invention may allow individual conference call participants or other interested parties to identify the target media for the conference call. The identification of the target media by the individual may be accomplished after the individual calls into the conference but prior to entering into the conference, after the conference is over or by accessing a web site. Thus, in one embodiment of the invention, a conference participant may call into the conference call 120 and enter an access code. The participant may then be prompted to enter or select a target media 122. Upon making such selection or opting out of delivery, the participant is joined into the conference call 124. When the conference call terminates 126, the delivery of the media is automatically initiated if the participant opted in to the delivery and identified the target 128.

It should be appreciated that rather than delivering the conference call content, embodiments of the present invention may simply allow a user to access the content on their own initiative. For instance, the correlation of various conference calls and information can be accomplished in one embodiment of the present invention but, individuals wishing to obtain this information may have to access an online web store or order the conference calls on their own.

Figure 2:
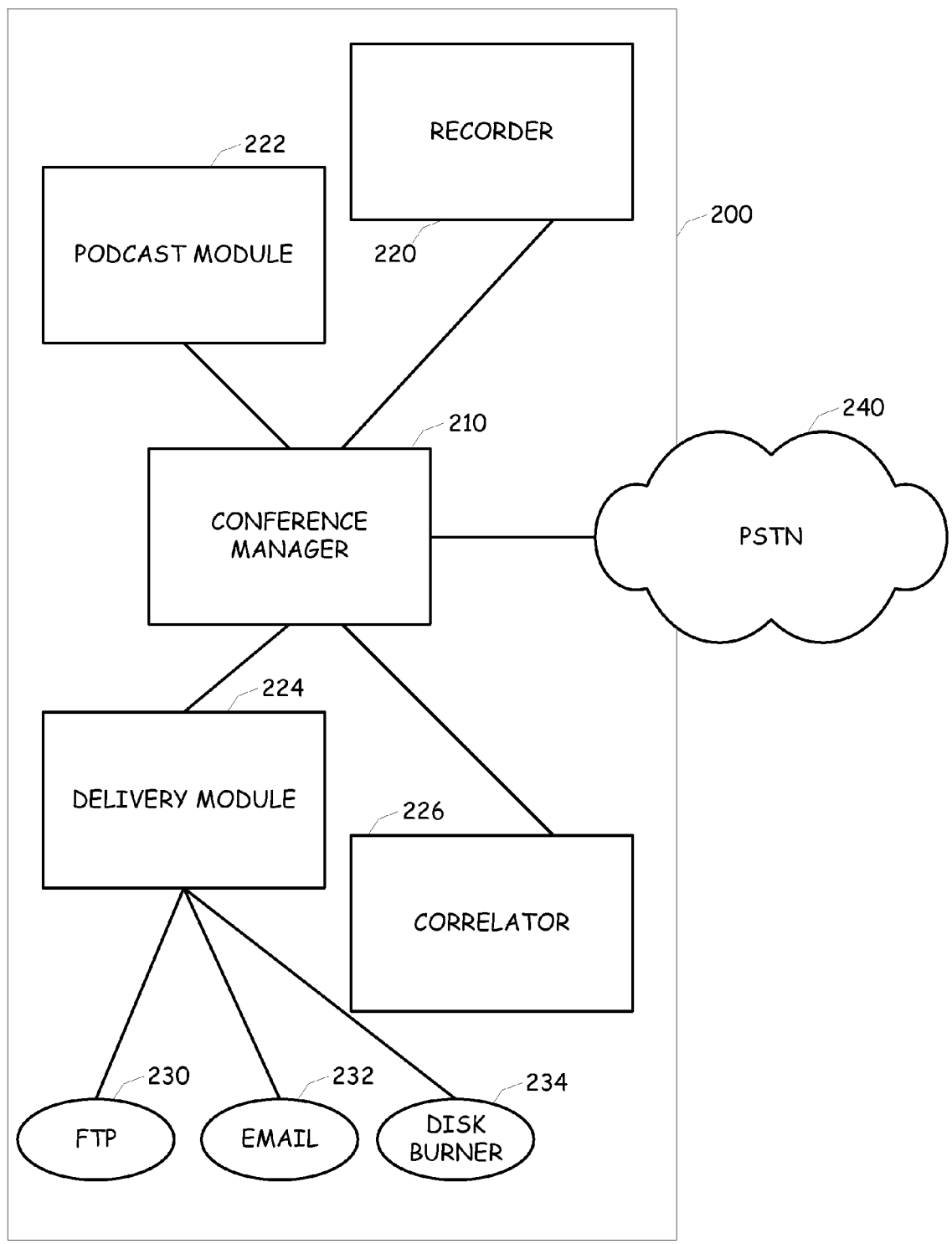
FIG. 2 is a block diagram illustrating one exemplary environment that is suitable for various embodiments of the present invention.

FIG. 2 is a block diagram illustrating one exemplary environment that is suitable for various embodiments of the present invention. The conference call system 200 is shown as including a conference manager 210 that interfaces to a recorder 220, a podcast module 222, a delivery module 224 a correlator 226 and the public switched telephone network PSTN or other network 240. It should be appreciated that the illustrated block diagram is simply a logical breakdown of some of the functions applicable to various embodiments of the present invention. Although the illustrated embodiment may be novel in and of itself, the present invention is not limited to the illustrated function blocks, the illustrated division or separation of the functionality, or only to the listed functions. Rather, the illustrated embodiment was selected as the most suitable illustration to describe the various aspects, features and functions of the present invention. The conference manager 210 serves as the interface to hosts that desire to set up a conference call, as well as to hosts and participants in joining and participating in a conference call. Thus, the steps illustrated in FIG. 1 that involve an interface to a user are typically embodied in the conference manager block 210.

If the host setting up the conference wishes the conference to be recorded, the hosts provide such instructions through the user interface of the conference manager 210. The conference manager 210 then interfaces with the recorder 220 to make a recording of the conference call. The conference call can be recorded in a standard format by the recorder 220 and then converted to specific formats, such as the podcast format, by a separate function block such as the illustrated podcast module 222. However, it will be appreciated that the functionality of the recorder and podcast module or other format specific module can be incorporated into a single functional block. It will also be appreciated that more than one format specific module may exist and/or actively operate on a recorded conference at the same time. For instance, the recorder may initiate the recording of a conference call an have it formatted as a podcast file, an MP3 file and a WAV file, as well as other formats, all available for delivery.

The conference manager 210 also interfaces to the correlator 226 which operates to correlate the presently recorded conference call with other conference calls and/or other collateral information, such as presentation materials, background information or references, video content, handouts, etc. As described in conjunction with FIG. 1, the correlator 226 can be implemented in a variety of manners and the present invention should not be considered as being limited to any particular implementation, although one or more of the described variations may in and of themselves be considered to be novel. In various embodiments, the correlator can be used to generate a database of various conference calls and indexing to search on and access those conference calls. In addition, the database may include a variety of other collateral related to the various conference calls. All of this information can be categorized and correlated in accordance with the above-described techniques. Thus, the system can then automatically searches for and retrieves related information or, individuals may access the system to search for related information using their own terms.

The conference manager 210 interfaces to the delivery module 224 for the purposes of delivering the recorded conference calls and/or related conference calls or collateral to various entities. As described above, the delivery mechanism may be selected by the host or by the various individuals. The illustrated embodiment shows three delivery routes: FTP 231, email 232 and burning a disk 234 for distribution. It will be appreciated that a variety of other techniques may also be employed in other embodiments of the present invention. For instance, the delivery module may be a web based store of databases and using a search engine, allows users to individually access and obtain the conferencing data. In another embodiment, the delivery module may be a mass mailing engine that generates email messages with correlated conferencing information, identifies interested parties based on a pre-created preference listings, and then bulk emails the information.

In the description and claims of the present application, each of the verbs, "comprise", "include" and "have", and conjugates thereof, are used to indicate that the object or objects of the verb are not necessarily a complete listing of members, components, elements, or parts of the subject or subjects of the verb.

The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of the art It will be appreciated by persons skilled in the art that the present invention is not limited by what has been particularly shown and described herein above. Rather the scope of the invention is defined by the claims that follow.

What is claimed is:

1. A method for providing post-conference call information, the method comprising the steps of:
    receiving conference call set-up information for a current conference call from a user via a reservation system interface, the call set-up information including correlation information identifying a previous conference call to be correlated with the current conference call;
    receiving the selection of at least one of a plurality of media destinations, wherein a media destination identified to receive a recorded representation of the current conference call and the previous conference call is selected by a subscriber to the current conference call or the previous conference call;
    detecting the commencement and termination of the current conference call;
    correlating the current conference call with the previous conference call in accordance with the correlation information received from the user via the reservation system interface; and
    providing the correlated conference call comprising the current conference call and the previous conference call in accordance with the selected media destination as indicated by the subscriber.

2. The method of claim 1, wherein the step of receiving conference call set-up information including correlation information further comprises the steps of:
    receiving a correlation factor; and
    receiving correlation data.

3. The method of claim 2, wherein the step of receiving the correlation factor further comprises the step of receiving information that indicates a plurality of previous conference calls.

4. The method of claim 1, wherein the step of receiving conference call set-up information including correlation information further comprises the step of receiving correlation data that is related to the content of the current and previous conference calls.

5. The method of claim 4, wherein the step of receiving correlation data that is related to the content of the current and previous conference calls further comprises receiving key words included in the current and previous conference calls.

6. The method of claim 4, wherein the step of receiving correlation data that is related to the content of the current and previous conference calls further comprises receiving an outline of the current or previous conference call.

7. The method of claim 1, wherein the step of receiving at least one of a plurality of media destinations further comprises receiving an indicator for burning a compact disk.

8. The method of claim 1, wherein the step of receiving at least one of a plurality of media destinations further comprises receiving an indicator for performing a file transfer.

9. The method of claim 1, wherein the step of receiving at least one of a plurality of media destinations further comprises receiving an indicator for performing an email delivery.

10. The method of claim 1, wherein the step of correlating the current conference call with the previous conference call in accordance with the correlation information comprises the step of combining a first recording associated with the previous conference call with a second recording associated with the current call.

11. The method of claim 1, wherein the step of correlating the current conference call with the previous conference call in accordance with the correlation information comprises the step of combining the collateral information.

12. A system for providing post-conference call support, the system comprising:
    a conference manager that interfaces to a telephone network and controls the access to, and monitoring of, conference calls, the conference manager comprising a reservation system interface for receiving call set-up information for a current conference call from a user, the call set-up information comprising correlation information that identifies a previous conference call to be correlated with the current conference call;
    a recorder that operates to record the current conference call and the previous conference call;
    a format module that places the recorded conference calls into a particular format;
    a correlator that operates to correlate the current conference call with the previous conference call in response to the correlation information received from the user via the reservation system interface; and
    a delivery module for delivering a recorded conference call, with or without correlated information, to a media destination using one of a plurality of delivery mechanisms, the media destination identified in a communication with a subscriber to a service and designated to receive the recorded conference call.

13. The system of claim 12, wherein the correlation information includes a list of key words.

14. The system of claim 12, wherein the correlation information includes an outline of the conference call.

15. The system of claim 12, wherein the correlation information includes a correlation factor which identifies related conference calls based on day and time.

16. The system of claim 12, wherein the correlation information includes a correlation factor which identifies related conferences by logistical information.

* * * * *